Patented Aug. 9, 1938

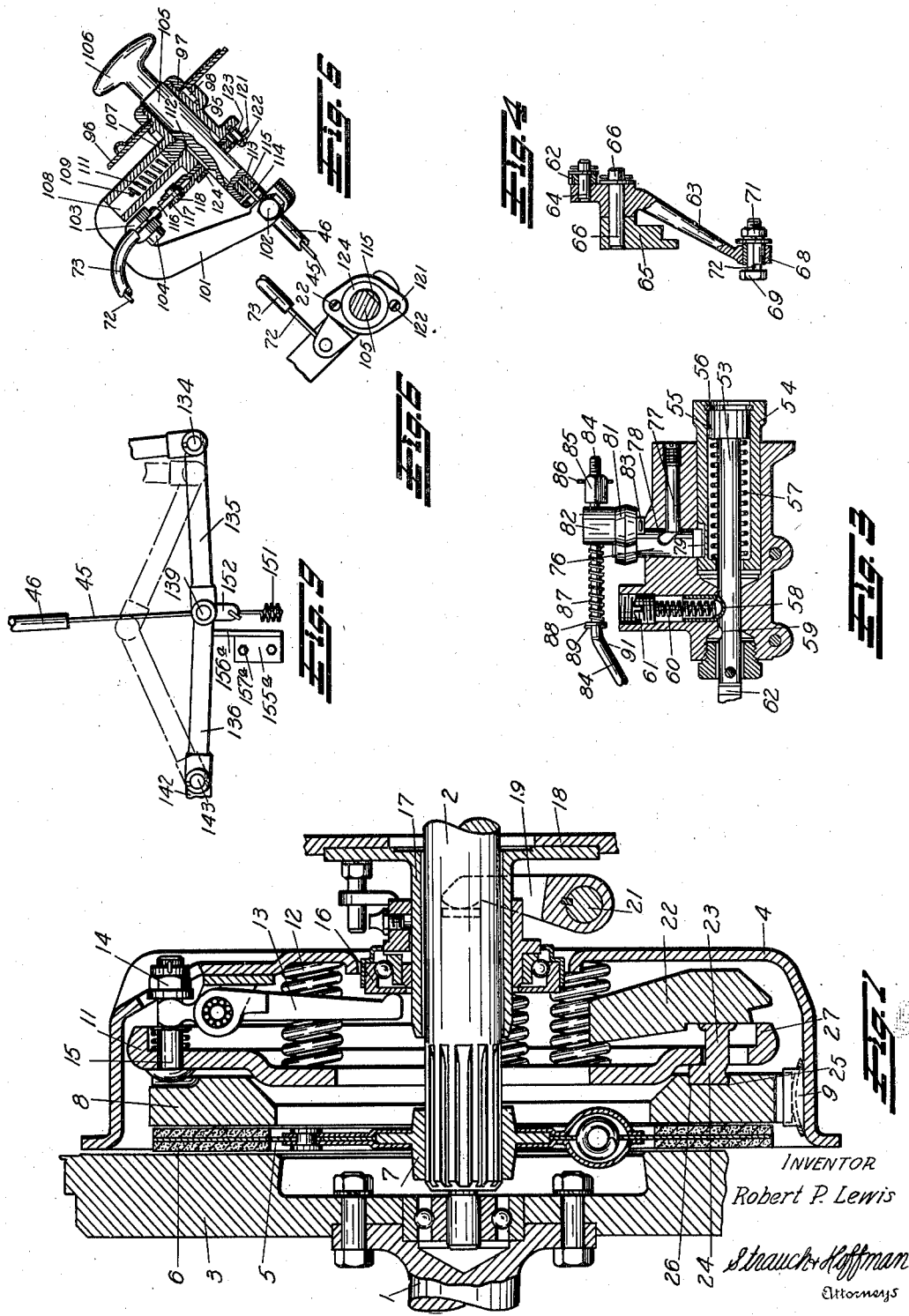

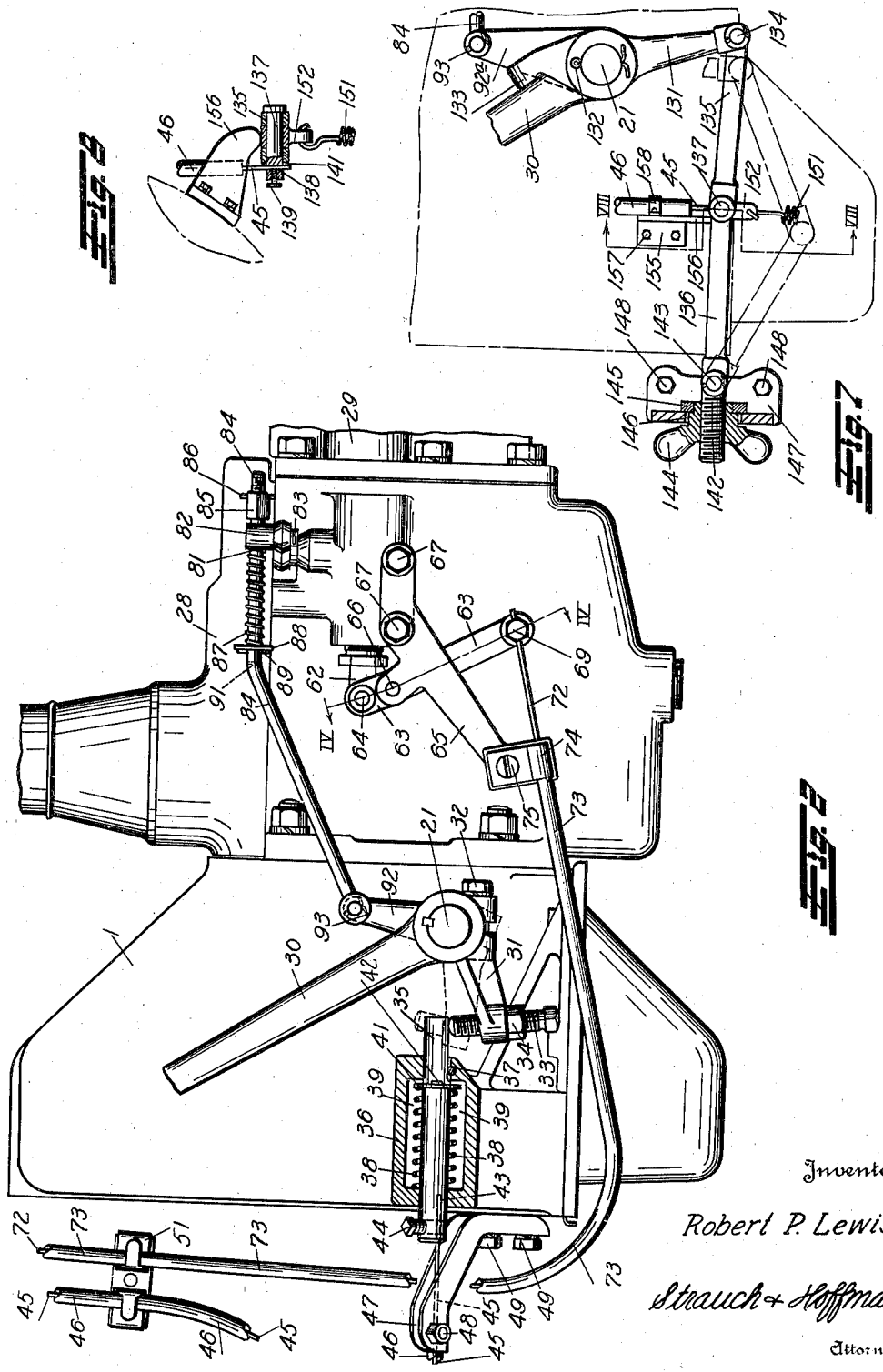

2,126,120

UNITED STATES PATENT OFFICE 2,126,120

AUTOMATIC CLUTCH MECHANISM

Robert P. Lewis, Toledo, Ohio, assignor to Automatic Drive and Transmission Company, Gloucester City, N. J., a corporation of New Jersey Application December 1, 1933, Serial No. 700,564

8 Claims. (Cl. 192—105)

The present invention relates to power transmitting mechanisms. More particularly the present invention relates to power transmitting devices embodying automatic or self-operating clutches, and it has to do with mechanisms for controlling their operation. The present invention is also concerned with correlating the operations of the units of a power transmitting drive of the type that embodies an automatic or self-operating clutch and a free wheeling unit.

The present invention aims to provide automatic or self-operating clutch controlling mechanisms of the general character shown in the Nail Patent No. 1,822,716 which possess the desirable operating characteristics thereof, and further highly desirable functions to be hereinafter pointed out, but which are constructed in a somewhat different manner.

The present invention also aims to simplify and render "fool-proof," the operation of drives of the character having an automatic or self-operating clutch and a free-wheeling unit. In drives of this character, it is necessary to accurately control the speed of the prime mover when it is desired to "lock out" the free-wheeling unit, or establish a two way drive between the prime mover and the load, because the operation of the clutch is solely automatic. In the event that the clutch is provided with means for disengaging it independently of the automatic engaging mechanism, the "locking out" operation may be effected without controlling the speed of the prime mover, but an organization of this character is not entirely fool-proof because careless or inexperienced drives might forget to operate the clutch disengaging mechanism prior to effecting the "locking out" operation, with the result that severe clashing occurs and destructive stresses are set up in the free-wheeling "locking out" mechanism which usually takes the form of a jaw or other type of positive clutch mechanism.

With either of the arrangements just described, if the "locking out" operation is attempted without first conditioning the mechanism, it is not only impossible to establish a two way drive between the prime mover and the load, which failure is hazardous under many driving conditions, but severe "clashing" occurs, and the stresses set up in the parts of the free-wheeling mechanism are of such magnitude as to cause them to be distorted or broken in many instances.

My invention makes it possible to "lock out" free-wheeling units in drive mechanisms of the character just described at any time irrespective of the relative or absolute speeds of the prime mover and the load, without clashing or damaging the parts.

The primary object of the present invention is to devise a novel mechanism for selectively holding the parts of an automatic or self-operating clutch in such a position as to render the operation of the clutch automatic in character.

Another major object of my invention resides in the provision, in an automatic or self-operating clutch of the character wherein a movable member is adapted to assume a clutch engaging position and a clutch disengaging position, of novel mechanisms for releasably holding the member in an automatic or intermediate position.

It is another object of my invention to devise, for use in a clutch having a member mounted for moving into two extreme positions, a novel mechanism for weaving the member into, and definitely arresting it in an intermediate position.

A further object of the present invention aims to devise a latch mechanism for releasably holding a clutch member in a predetermined position, which is so designed as to require forces of only nominal magnitude to release it.

Another object of my invention is to devise, for use in clutches of the character having a movable member that is urged in one direction, a novel mechanism for moving the clutch member in the opposite direction and holding it in a predetermined position, and which may be adjusted so as to variably locate the predetermined position.

It is another important object of my invention to devise, for use in power transmitting drives of the character wherein an automatic clutch is coupled to a free-wheeling unit, means for rendering the free-wheeling unit incapable of being locked out when the clutch is engaged.

Another object of the present invention aims to devise, for use in power transmitting drives of the character wherein an automatic clutch and a free-wheeling unit are employed to transmit power, means for insuring disengagement of the clutch whenever the free-wheeling unit is being locked out, thereby rendering said operation fool-proof.

My invention further aims to devise a novel mechanism for controlling the parts of an associated automatic clutch and free-wheeling unit.

My invention further aims to devise, for use with a dual Bowden wire assembly or the like, a novel mechanism for selectively controlling the operation of the actuator wires or other members.

Further objects of this invention will become apparent as the specification proceeds in connection with the annexed drawings, and from the appended claims.

In the drawings:

Figure 1 is a longitudinal sectional view of one form of automatic clutch with which my invention may be used.

Figure 2 is an elevational view, with parts in section, of the clutch shown in Figure 1, associated with a transmission and free-wheeling unit and it illustrates one form of my controlling mechanism applied thereto.

Figure 3 is a sectional view of a part of the free-wheeling mechanism illustrated in Figure 2.

Figure 4 is a sectional view taken on line IV—IV of Figure 2, looking in the direction of the arrows.

Figure 5 is a longitudinal sectional view of my improved mechanisms for controlling the Bowden wire organizations employed in the present embodiment of the invention.

Figure 6 is a transverse sectional view of the device shown in Figure 5.

Figure 7 is an elevational view, with parts in section, illustrating the clutch shown in Figure 1 provided with a somewhat modified form of controlling mechanism also forming part of my invention.

Figure 8 is a sectional view, taken substantially on the line VIII—VIII of Figure 7 and Figure 9 is an elevational view illustrating a further modification of my invention.

With continued reference to the drawings, wherein like reference characters are employed to designate like parts throughout the several views thereof, and with particular reference to Figure 1, the automatic clutch is constructed and operates as follows: Driving and driven shafts 1 and 2 respectively are mounted for rotation in any suitable manner and the driving shaft carries a flywheel 3 which has a cover 4 secured thereto. A driven disc 5, having facings 6 secured thereto, is carried by a hub 7 splined to shaft 2 and cooperates with a face of flywheel 3 and with an automatic plate 8, which is mounted for synchronous rotation with the driving shaft 1 and flywheel 3 by means of driving lugs 9 which are secured to cover 4 and seat in recesses in the automatic plate. A reaction plate 11 is mounted for rotation with, and is urged toward the automatic plate by means of holdback spring assemblies, (not shown) and the automatic and reaction plate assembly is urged toward the flywheel by means of compression springs 12 which are interposed between cover 4 and plate 11.

Movement of the automatic and reaction plate assembly under the influence of springs 12 is adapted to be controlled by means of levers 13 journalled on cover 4 and which act against nut and washer assemblies 14 carried by bolts 15 secured to plate 11. The inner ends of levers 13 cooperate with a throwout assembly 16 which is mounted for axial movement on a supporting sleeve 17 secured to a housing 18. Throwout assembly 16 is adapted to be actuated by means of a throwout fork 19 secured to a throwout shaft 21. In Figure 1, the throwout assembly is disposed in automatic position, and it is maintained in this position against the action of springs 12, during certain phases of operation of the clutch by mechanism to be presently described.

Automatic plate 8 and reaction plate 11 are adapted to be forced away from each other in response to acceleration of the driving shaft, by means of a plurality of weights designated generally at 22. Weights 22 are carried by levers 23 which have laterally extending portions 24 disposed and clamped between plates 8 and 11 by means of hold-back assemblies. Lever portions 24 are provided on their outer sides with knife edges 25 which are adapted to fulcrum in the outer corners of recesses 26 formed in the automatic plate when the levers swing outwardly in response to centrifugal force.

With driving shaft 1 operating at idling or disengaging speed, and with the throwout mechanism disposed in the position shown in Figure 1, the plates are disengaged and shafts 1 and 2 are accordingly uncoupled. As shaft 1 is accelerated above idling speed, weights 22 rock outwardly about edges 25 as axes and force plates 8 and 11 away from each other and cause pressure to be built up in springs 12 and between the plates. This action forces reaction plate 11 to the right and thereby relieves levers 13 of the stress of springs 12. Torque of gradually increasing magnitude is thereby automatically transmitted from shaft 1 to shaft 2, and when shaft 1 attains a predetermined speed the plates are brought into non-slipping engagement by the action of the weights, and at a speed slightly in excess of this speed the weights move out into engagement with a flange 27 provided on plate 11 and they are thereby prevented from moving further outwardly and building up further pressure between the plates in response to further acceleration of the driving shaft. When the driving shaft is decelerated to idling speed, the weights are rocked inwardly and the automatic and reaction plates are brought towards each other, by the holdback assemblies and the clutch is thereby disengaged.

When the clutch is automatically engaged in the manner just described the plates may be disengaged by moving the throwout mechanism to the left, which, through levers 13 and bolts 15 moves reaction plate 11 and automatic plate 8 to the right, and thereby disengages the latter from the driven member.

When the parts are disposed in the positions shown in Figure 1, and with the driving shaft operating at or below idling speed, the plates may be brought into driving engagement by allowing the throwout assembly to move to the right under the influence of springs 12. Movement of the throwout assembly to the right allows springs 12 to force plates 8 and 11 to the left, and bring plate 8 into driving engagement with the driven member.

In Figure 2 of the drawings I have illustrated the automatic or self-operating clutch mechanism just described as being associated with a conventional transmission mechanism 28 and a free-wheeling unit 29. The construction of free-wheeling unit 29 is well known in the art and it briefly consists of an overrunning clutch so related with the parts as to allow the driven propeller shaft to overrun the driving transmission shaft, or "free wheel," and a jaw or other suitable clutch is incorporated in the free-wheeling unit for the purpose of cutting out the overrunning clutch or establishing a two way connection between the prime mover and the load at the will of the operator.

Shaft 21 extends outwardly of housing 1 and carries a clutch pedal 30 thereon. Clutch pedal 30 is preferably rigidly secured to shaft 21 by means of a key or the like, and although I have illustrated it as being associated with shaft 21, it may, if desired, be mounted on an independent pedal shaft and interconnected with shaft 21 by means of a suitable linkage mechanism or the like. A lever 31, having a bifurcated hub, is mounted on shaft 21 and is clamped thereto by means of a cap screw 32. A screw 33 is threaded into lever 31 and is adapted to be locked in adjusted position therein by means of a locknut 34 or the like.

Screw 33 is adapted to cooperate with the flat side of a cylindrical plunger 35 which is mounted for sliding movement in a supporting member 36. Member 36 may be carried by the mechanism in any suitable manner, but in the present instance it is shown as being an integral part of housing 1. Plunger member 35 is restrained against rotation in member 36 by means of a pin 37 which seats in an aperture therein and cooperates with the flattened side of plunger 35. Member 35 is urged to the right (Figure 2) by means of a compression spring 38 which is coiled about plunger 35 and is located in a recess 39 formed in member 36. Spring 38 acts against one end of recess 39 and at the other bears against washer 41 which is restrained against endwise movement on plunger 35 by means of a pin 42 or the like. Pin 42 also serves the function of definitely limiting the extent of movement of the plunger 35 to the right under the influence of spring 38. Access to the parts just described is gained from the interior of the clutch housing.

Received in a recess 43 located in plunger 35, and clamped therein by means of a set screw 44, is one end of a control wire 45, which is associated with a flexible housing or sheath member 46. The lower end of housing 46 is frictionally clamped between the U-shaped extremity of a bracket 47 by means of a nut and bolt assembly 48. Bracket 47 may be secured to any suitable part of the mechanism, but in the present instant it is secured to clutch housing 1 by means of cap screws 49.

Housing 46 and wire 45 are led upwardly to a control mechanism which will hereinafter be more fully described, and their intermediate portions are supported by a bracket 51, which is secured to the prime mover or like support in any desired manner.

In Figure 2, the parts are shown in automatic position, with screw 33 engaging plunger 35, and with throwout shaft 21 disposed in this position throwout assembly 16 assumes the position in which it is shown in Figure 1, and if the prime mover is stopped, or is operating substantially at idling speed, automatic plate 8 will accordingly be held in the disengaged position shown in Figure 1 against the action of springs 12.

With the parts in the position shown in Figure 2, the engine may be accelerated to automatically produce clutch engagement in the manner previously described, and if it is desired to manually declutch the mechanism, pedal 30 may be depressed to rock shaft 21 in a counterclockwise direction, thereby moving the throwout assembly to the left and moving the reaction plate to the right. During the declutching operation, screw 33 merely moves away from the face of plunger 35, and the locking mechanism therefore does not interfere with this movement of parts.

If it is desired to manually engage the clutch, pedal 30 is preferably slightly depressed to relieve plunger 35 of stress, and wire 45 is actuated so as to move plunger 35 to the left against the action of spring 38 and bring its flat face out of the path of movement of screw 33. This operation allows springs 12 to bring the plates into engagement and they also act through levers 3, throwout assembly 16, and fork 19, and bring shaft 21 and lever 31 into the dotted line position shown in Figure 2. When it is desired to restore the parts to automatic position, pedal 30 is depressed so as to bring the parts substantially into the position shown in Figure 2, and wire 45 is actuated so as to allow spring 38 to return plunger 35 to its locking or latching position in the path of movement of screw 33. In connection with this phase of the operation, friction means are preferably associated with wire 45 so as to yieldingly maintain it in its withdrawn position against the action of spring 38, but it is to be understood that if it is desired, the parts may be so designed that spring 38 is capable of returning the plunger 35 to its latching position as soon as wire 45 is released.

Should wire 45 be released while the parts are disposed in manually engaged condition, with screw 33 disposed in the path of movement of plunger 35, the latter will abut screw 33 under these conditions, and when pedal 30 is actuated to bring the parts into automatic position, plunger 35 will snap into latching position under the influence of spring 38.

When facings 6 have undergone sufficient dimensional changes, through particles thereof wearing away during the normal operation of the mechanism, so as to increase the idle release clearance to an undesirable extent, the plate assembly may be adjusted to the left in order to decrease the clearance. This compensating adjustment is made by loosening locknut 34, and backing screw 33 off sufficiently to allow springs 12, acting through plate 11, levers 13, throwout assembly 16, shaft 21 and lever 31, to bring automatic plate 8 into the proper relation with flywheel 3. The proper clearance may be established by any suitable means or in any suitable manner as for instance, by inserting a feeler gauge between facing 6 and the flywheel face, and when the adjustment is complete, locknut 34 may be tightened to hold the parts in adjusted position.

In the event that levers 13 take undesirable angular positions after the mechanism had been adjusted several times in the manner just described, their correct relationship may be reestablished by properly adjusting nuts 14. In connection with the adjusting mechanism just described, it is to be understood that instead of locating screw 33 in lever 31, it may be associated with plunger 35 is desired, or it may be omitted and supporting member 36 adjustably mounted in such manner as to produce angular adjustive movements of shaft 21 when the latter is held in automatic position by plunger 35, and equivalent organizations of this character are intended to be embraced by the appended claims.

With reference now to the controlling mechanism for the free-wheeling unit, a free-wheeling control rod 53 is slidably mounted in the transmission case and a free-wheeling controlling fork 54 is slidably mounted in the transmission case and is telescoped over rod 53. Shift rod 53 is provided with an enlarged portion 55 which is urged toward a snap ring 56 located in fork 54 by means of a compression spring 57 or the like. In Figure 2, free-wheeling shift fork 54 is shown disposed in free-wheeling position, and it is adapted to be moved to the right by a mechanism to be hereinafter described, for the purpose of cutting out the operation of the overrunning clutch and establishing a two-way drive between the transmission and propeller shafts. Shift fork 54 is connected to the axially movable jaw clutch member of the lockout clutch (not shown).

Rod 53 is adapted to be yieldingly retained in its free-wheeling and non-free-wheeling positions by means of a detent 58 which cooperates with a pair of notches 59 formed in rod 53. Detent 58 is urged downwardly toward rod 53 by means of a compression spring 60 which is backed up by a plug 61 which is threaded into the transmission case.

Pivotally connected to rod 53, by means of a pin or the like, is a short link 62, which in turn is connected to a lever 63 by means of pin 64. Lever 63 is pivotally supported on a bracket 65 by means of a pin 66. Bracket 65 is secured to the transmission case or any other suitable part of the mechanism by means of cap screws 67 or the like. Journalled in the lower end of lever 63 is a sleeve 68 which carries a bolt 69. An actuator wire 72 extends through an aperture in bolt 69 and is drawn up against the edge of bushing 68 by means of a nut 71 threaded on bolt 69. The axial length of sleeve 68 is greater than that of the bore in lever 63, (Figure 4) so that when nut 71 is turned home, it will not exert frictional forces upon the lever, whereby free oscillation of sleeve 68 therein at all times is assured. Wire 72 is carried in a housing 73 whose lower end is clamped between a bracket 74 and an arm formed on bracket 65 by means of a cap screw 75 or the like. Housing 73 is led upwardly in the vehicle and is supported by bracket 51, and although it may be actuated in any desired manner, I preferably interconnect it with the controlling mechanism for the clutch latch, which will be hereinafter described.

In Figure 2 the parts are shown in free-wheeling position and, assuming that the mechanism is installed in an automotive vehicle, the vehicle is started by placing the transmission in the desired gear and accelerating the engine, which automatically engages the clutch in the manner previously described.

With the vehicle proceeding with the clutch automatically engaged and with the engine propelling the vehicle, if the accelerator is released the propeller shaft will immediately overrun with respect to the transmission, with the result that the engine immediately drops to idling speed. When idling speed is substantially attained, the automatic clutch disengages in the manner previously described. The vehicle is now free-wheeling and in view of the fact that the free-wheeling unit renders the propeller shaft incapable of driving transmission, and as the automatic clutch is disengaged, the transmission is completely at rest or "dead". When the accelerator is again depressed so as to propel the vehicle, the automatic clutch establishes a drive between shaft 1 and 2 when the speed of the engine attains a predetermined value, and when shaft 2, under the influence of the engine, has been accelerated to a speed corresponding to the propeller shaft speed, (assuming the vehicle is in high gear) the overrunning clutch in the free-wheeling unit again establishes a drive between the transmission and the propeller shaft, with the result that the vehicle is again driven by the engine.

If it is desired to cut out the free-wheeling unit when the vehicle is proceeding in any gear, the accelerator is released so as to allow the engine to drop to idling speed and produce automatic disengagement of the clutch to thereby disengage or uncouple the engine and transmission. Wire 72 is then actuated to rock lever 63 and shift rod 53 to the right and thereby bring the jaw or other clutch elements into driving relationship. When this operation is complete, a two-way driving connection is established between the transmission and the propeller shaft and the engine may be again accelerated so as to reengage the clutch and pick the vehicle up in the gear involved. If desired, the accelerator may not necessarily be depressed, but clutch pedal 30 may be actuated so as to disconnect shafts 1 and 2 prior to actuation of wire 72. I preferably however interconnect the clutch pedal with mechanism for making it impossible to lock out the free-wheeling unit unless the clutch pedal is depressed, and this mechanism will now be described.

Journalled in the transmission casing is a shaft or pin 76. A locking pin 77 is threaded into the transmission casing and extends into an arcuately formed slot 78 in shaft 76, and is adapted to produce axial movement of shaft 76 when the latter is oscillated. The lower end of shaft 76 is adapted to seat in a recess 79 formed in fork member 54, and in Figure 2 of the drawings the parts are shown in locked condition. Member 76 accordingly restrains shift fork 54 against right-hand movement and thereby prevents the locking out operation from being effected.

Shaft 76 is adapted to be actuated by a lever 81 which is secured thereto in any suitable manner and receives the reduced portion of a swivel member 82 which is restrained against removal therefrom by a cotter pin 83 or the like. Extending through, and slidably associated with the walls of an aperture formed in member 82 is a rod 84 which has a nut 85 threaded thereon. Nut 85 is adapted to engage member 82 and thereby rock shaft 76 and it is retained in adjusted position on rod 84 by means of a cotter pin 86 or the like. A compression spring 87 encircles rod 84 and bears against member 82. The other end of spring 87 bears against a washer 88 which is restrained against axial movement on rod 84 by means of a cotter pin 89. A second cotter pin aperture 91 is formed in rod 84 for a purpose that will presently appear. The forward end of rod 84 is bent and extends through an aperture in a lever arm 92, which is preferably integrally formed with lever 31. Rod 84 is restrained against displacement from lever arm 92 by means of a cotter pin 93.

With the vehicle proceeding with the clutch automatically engaged and with the transmission in gear, if it is desired to lock out the free-wheeling unit, the accelerator is released and the clutch pedal is depressed. Operation of the clutch pedal in this manner disengages the clutch in the manner previously described, and acting through lever 92, link 84, and lever 81, it takes up the clearance between member 85 and member 82 and rock shaft 76. When shaft 76 is rocked in this manner, the cam faces thereof cooperate with pin 77 and cause shaft 76 to move upwardly and disengage itself from recess 79 in fork 54, thereby freeing the lockout mechanism. Wire 72 may then be actuated so as to rock lever 63 and fork 54 to the right, which engages the jaw or other lockout clutch employed in the device.

A two-way drive is thereby established between the transmission and the propeller shaft and the clutch pedal may be released and the engine accelerated to again drive the vehicle. Release of the clutch pedal through rod 84, tends to restore shaft 76 to the position shown in Figure 2, but in view of the fact that part 54 is located with its recess 79 out of registry with the end of shaft 76, the latter remains in its upward position in engagement with the cylindrical portion of fork 54. Clutch pedal 30 nevertheless is allowed to return to its retracted position because further movement of rod 84 to the right merely results in compressing spring 87.

When it is again desired to establish a free-wheeling drive, wire 72 is actuated to swing lever 63 into the position shown in Figure 2 and when the operation is complete shaft 76 drops into recess 79 located in fork 54, in view of the loaded or compressed state of spring 87 under these conditions. Spring 57 yieldingly couples the parts, and serves to prevent the free-wheeling unit from being "cut in" when the drive is transmitting a heavy coast load because it merely compresses when it is attempted to shift fork 54 to the left under such conditions. With this novel mechanism it is obvious that the free-wheeling unit cannot be locked out unless the clutch is fully disengaged, regardless of any tendency that may be present for the speed responsive mechanism to bring the plates together.

When it is desired to manually engage the clutch wire 45 is actuated so as to pull plunger 35 out of the path of movement of screw 33 in the manner previously described, thereby allowing shaft 21 to rock clockwise, which results in rod 84 moving to the right. In the event that shaft 76 is maintained in its unlatched position under these conditions by reason of the free-wheeling unit being locked out, movement of rod 84 to the right merely serves to further compress spring 87.

Although I have illustrated a particular type of mechanism for coordinating the operation of the free-wheeling unit lockout mechanism and the clutch pedal, it is to be understood that any suitable type of mechanism that will ensure complete disengagement of the clutch prior to actuation of the free-wheeling lockout mechanism may be used if desired, without departing from the spirit of the present invention. Moreover my device has been shown as being embodied in the specific type of automatic clutch mechanism, but it is to be understood that it may be successfully employed in any type of automatic clutch mechanism which is subject to manual or automatic disengagement, i. e., automatic clutch mechanisms having means for disengaging them independently of their automatic or speed responsive mechanism.

When the clutch has been adjusted several times to compensate for wear of the facings, lever arm 92 may take such a position when the clutch is manually engaged that spring 87 will be compressed to an excessive extent. This condition may be readily remedied by removing pin 89 from its aperture and inserting it in aperture 91. As this has the effect of relieving the compression of spring 87, it is obvious that this operation fully compensates for the spring compressing effects of the facing-wear-compensating adjustment. In the event that after this adjustment has been made, it is found that too much clearance exists between nut 85 and member 82, pin 86 may be removed and nut 85 turned up sufficiently to establish the proper relation between it and member 82.

As previously explained, control wires 45 and 72 may be actuated in any desired manner, but I preferably associate them with a common controlling means in order to simplify the control mechanism and to provide a single operating member for the transmission. In the drawings I have illustrated one form of mechanism that may be utilized for this purpose, and it consists of a body portion 95 which preferably extends through the instrument panel 96 of the motor vehicle and is clamped thereto by means of a nut 97 which is threaded on a reduced portion thereof. A dowel pin 98 is frictionally fitted in member 95 and extends through an aperture formed in the instrument panel for the purpose of correctly locating the position of the parts in assembling the device.

Member 95 is provided with a preferably integrally formed arm 101 which receives Bowden wire housing 46 between the bifurcations of its lower end. Housing 46 is firmly gripped between the bifurcation of arm 101 by means of a cap screw 102 or the like. The intermediate portion of arm 101 is provided with bifurcations 103 between which housing 73 is firmly gripped by means of a cap screw 104.

An operating plunger or control rod 105 is slidably mounted in a bore in body member 95 and is provided with an operating knob 106, which is preferably other than circular in form so that it may be gripped and oscillated as well as be manipulated for axial movement.

Control rod 105 is adapted to be yieldingly held in either of two axially spaced operable positions by means of a detent 107 which is located in a hollow portion 108 of body member 95. A compression spring 109, which reacts against a pin 111, located in portion 108, is adapted to urge detent 107 downwardly into engagement with notches 112 formed in rod 105. A preferably cylindrical member 113 is secured to wire 45 by means of a set screw or the like and is mounted for swiveling movement in a bore located in rod 105. Member 113 is restrained against movement out of its bore by means of a pair of pins 114 which are secured in plunger 105 and engage it either side of wire 45.

With the structure just described, knob 106 may be withdrawn or pulled outwardly to actuate wire 45 and move plunger 35 into its unlatched or unlocked position, and spring 109 is preferably of sufficient strength to maintain plunger 105 in its outer position against the retracting influence of spring 38.

Knob 106 may be also oscillated to actuate the free-wheeling control, and to this end plunger 105 is provided with a flattened side 115. A pair of similarly shaped plates 116 and 117 fit over plunger 105 and have apertures therein having a configuration corresponding to that of plunger 105, and they are thereby accordingly coupled together for synchronous oscillation with rod 105. Plates 116 and 117 are provided on their upper ends with spaced arm portions in which a swivel member 118—which is secured to wire 72—is journalled. Oscillatory movement of member 105 accordingly transmits similar movement to plates 116 and 117, and thereby actuates wire 72.

Plates 116 and 117 are restrained against movement away from body member 95 by means of a cover or retainer plate 121 which is secured to body member 95 by means of cap screws 122. Screws 122 are located beyond the periphery of plates 116 and 117 and are provided with sleeve or spacer members 123, which are clamped between plate 121 and the face of member 95, so as to prevent plates 116 and 117 from being frictionally clamped between these two members.

Secured to the face of plate 117 by means of a spot welding or like operation, is a ring member 124 which is freely mounted in the aperture within cover 121, and slidably receives plunger 105.

When it is desired to actuate the free-wheeling lockout mechanism, knob 106 may be oscillated so as to rock plates 116 and 117 and pull wire 72 into its extended position. Sleeve members 123 are adapted to be contacted by the arm or lever portions of plates 116 and 117 and thereby serve to limit the oscillatory movement of plunger 105, but it is to be understood if desired, any other suitable limiting means may be employed, without departing from the spirit of the present invention. It is also to be understood that although I have illustrated my novel control mechanism as being used in conjunction with the free-wheeling and automatic clutch controls in an automotive vehicle, it is to be understood that it may be used whenever it is desired to operate a Bowden wire organization or any other type of mechanism wherein two or more actuating devices are involved.

With reference now to Figure 7 of the drawings, I have illustrated a modified form of latch mechanism for releasably holding the throwout mechanism in automatic position.

In this form of the invention lever 92a is keyed to shaft 21 and lever 31 is replaced by a lever 131, which is mounted for free oscillation on shaft 21, and it is retained thereon by means of a cotter pin 132 or the like. A laterally or axially extending finger 133 is preferably formed on the upper end of lever 131, and is adapted to engage the upper side of clutch pedal 30.

Journalled on a pin 134, in the clevis end of lever 131 is a link 135, and the latter is pivotally connected to a similar link 136 by means of a pin 137. Actuator wire 45 is received in an aperture 138 in pin 137 and is frictionally retained in adjusted position therein by means of a set screw 139. A washer 141 is disposed between wire 45 and the bifurcated end of link 135 and serves to reduce the operating friction. Although I have illustrated a particular device for actuating links 135 and 136, it is to be understood that the Bowden wire assembly may be replaced by a hand or foot operated lever or linkage mechanism without departing from the spirit of the present invention.

Link 136 is provided with a forked end and is pivoted to a threaded member 142 by means of a pin 143. A wing nut 144, having a separable portion 145 threadedly secured thereto, is threaded on member 142. Prior to assembling nut 144 and member 145, the former is inserted into an aperture 146 located in a bracket member 147 which is supported on the clutch housing by means of cap screws 148 or the like, and the parts are so designed, that when member 145 is turned home against the shoulder formed on nut 145, sufficient clearance will exist to insure free rotation of the assembly within bracket 147.

In Figure 7 the parts are shown in automatic position, with pin 137 disposed just above the center of pins 134 and 143, or just slightly above "dead center." Under these conditions, knob 106 is in its withdrawn position and the parts are maintained in the positions shown in Figure 7 by the action of detent 107, and the action of the control mechanism is the reverse of that of the previously described modification of my invention.

With the clutch automatically engaged in the manner previously described, and it is desired to disengage the plates without decelerating the engine to the automatic disengaging speed of the clutch, the clutch pedal may be depressed to move the throwout assembly into disengaging position in the manner previously described. During this operation pedal 30 merely moves away from finger 133, and the parts of the latch mechanism accordingly remain undisturbed.

If it is desired to engage the clutch when the prime mover is operating below the automatic engaging speed of the clutch, knob 106 is pushed in, which, acting through wire 45, swings links 135 and 136 downwardly past dead center. When the links have swung past dead center, springs 12 acting through the intermediary of the throwout assembly 16, shaft 21 and lever 131, move the links into the dotted line positions. In some instances it is undesirable to place wire 45 under compression, and in order to render the device completely workable under such conditions I have provided a means for automatically swinging the parts past dead center when initial inward movement of knob 106 takes place. In the present embodiment of the invention it takes the form of a tension spring 151, whose upper end is hooked into an eye 152 formed on link 136, and whose lower end is anchored to a bracket, (not shown) which may be secured to the clutch housing in any suitable manner. Spring 151 is preferably of such strength as to swing the parts past dead center against the action of springs 12, when knob 106 is pushed in, but it is to be understood that the parts may be designed so as to stop short of, or below dead center when knob 106 is disposed in its outermost position, and thereby avoid the necessity for a spring or other means for the purpose of swinging the parts past dead center.

When it is desired to restore the parts to automatic position, knob 106 is pulled out, thereby actuating wire 45 and pulling links 135 and 136 upwardly into the position shown in Figure 7. If desired however, pedal 30 may be depressed to restore the parts to automatic position. In this connection it should be understood that although I have illustrated manually operable means for restoring the links to automatic position, the Bowden wire assembly may be replaced or supplemented by a vacuum or other fluid pressure operated cylinder or diaphragm assembly, which is operable in accordance with variations in intake manifold pressure, or fluctuations in the magnitude of the power delivered to shaft 1, if desired without departing from the spirit of the present invention. The device, when operated by power means, may be utilized to automatically pull the parts into automatic position when prime mover is started or is operated at idling speeds, and/or for introducing a power response phase into the normal speed responsive operation of the clutch, and the appended claims are intended to embrace my mechanisms when they are utilized in organizations of this character.

When it is desired to adjust the automatic and reaction plate assembly toward the flywheel in order to compensate for wear of the facings, nut 144 is turned so as to allow the link assembly to move to the left. If desired any suitable mechanism may be used to lock nut 144 in position after the adjusting operation has been completed.

Although I have shown a particular form of adjusting mechanism as being embodied in my device, it is to be understood that any other suitable form of adjusting mechanism may be employed without departing from the spirit of the present invention. For instance a screw assembly of the type shown in Figure 2, (33 and 34) may be associated with finger 133 and designed to engage pedal 30, or one or both of the toggle links may be made adjustable if desired, and the appended claims are intended to embrace equivalent constructions of this character.

In some installations, where the clutch driving spring pressure is heavy, or where the parts are subject to abuse, it is desirable to provide means for preventing the springs from urging the link assembly too far above dead center, and to this end I provide a bracket member 155, having a finger 156, which is secured to the clutch housing by means of cap screws 157 or the like. The lower end of sheath 46 is preferably secured to bracket 155 by means of a clip 158 or the like. Finger 156 is adapted to contact the upper side of link 136, and thereby definitely limit upward movement of the link assembly past dead center under the influence of wire 45 and springs 12. If desired, a set screw or the like may be associated with bracket 155 for the purpose of variably adjusting the limit of upward movement of the link assembly.

In Figure 9 I have shown the latch mechanism just described with the parts thereof designed to operate in a somewhat different manner.

In this form of the invention links 135 and 136 are designed to move upwardly when they are pulled past dead center, and housing 46 accordingly terminates short of them, and bracket 155a is located below, and is adapted to cooperate with the lower side of link 136.

The operation of this device is somewhat similar to that of the device shown in Figure 7, and in Figure 9 the parts are shown in automatic position, with the links disposed slightly below dead center, and with link 136 held in contact with bracke 155a under the influence of spring 151.

When it is desired to engage the clutch, knob 106 is pulled out, so as to cause wire 45 to pull the links upwardly past dead center against the action of spring 151. When the links have been lifted to a predetermined position by the control assembly, springs 12, acting through the throwout assembly, shaft 21, and lever 151, swing the links into their dotted line position against the action of spring 151.

As there are no forces tending to restore knob 106 to its inner position under these conditions detent 107 may be omitted from this form of the invention if desired. The parts may be restored to automatic position by depressing pedal 30, which allows spring 151 to pull the links below dead center, thereby pulling wire 45 and knob 106 into their inner positions. If desired spring 151 may be omitted from this embodiment of my invention and gravity relied upon to bring the link assembly below dead center.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an automatic clutch embodying frictional clutch elements and having a controlling member mounted for movement into an engaged position, wherein the clutch is engaged at all speeds, a disengaged position, wherein the clutch is disengaged at all speeds, and an intermediate automatic position, wherein clutch engagement is automatically responsive to variations in the speed of one of the clutch elements, said controlling member carrying an abutment, means for selectively locking said member against movement from automatic position to engaged position, comprising a plunger mounted for longitudinal movement from a retracted position into a locking position in the path of said abutment, a working face on said plunger extending substantially in parallelism with its longitudinal axis, said member being movable from automatic position to disengaged position without interference from said plunger when the latter is disposed in locking position, and selectively operable means for moving said plunger from locking position into retracted position to allow said member to be moved from automatic position to engaged position.

2. In an automatic clutch embodying frictional clutch elements and having a controlling member mounted for movement into an engaged position, wherein the clutch is engaged at all speeds, a disengaged position, wherein the clutch is disengaged at all speeds, and an intermediate automatic position, wherein clutch engagement is automatically responsive to variations in the speed of one of the clutch elements, means for selectively locking said member against movement from automatic position to engaged position, comprising a plunger mounted for longitudinal movement from a retracted position into a locking position in the path of said member, said member being movable from automatic position to disengaged position without interference from said plunger when the latter is disposed in locking position, resilient means urging said plunger toward locking position, and means for moving said plunger out of locking position against the action of said resilient means to allow said member to be moved from automatic position to engaged position.

3. In an automatic clutch embodying frictional clutch elements and having a controlling lever mounted for movement into an engaged position, wherein the clutch is engaged at all speeds, a disengaged position, wherein the clutch is disengaged at all speeds, and an intermediate automatic position, wherein clutch engagement is automatically responsive to variations in the speed of one of the clutch elements, means for selectively locking said lever against movement from automatic position to engaged position, comprising a plunger mounted for longitudinal movement from a retracted position into a locking position in the path of said lever, said lever being movable from automatic position to disengaged position without interference from said plunger when the latter is disposed in locking position, said plunger being mounted for translational movement in a direction substantially normal to the axis of said lever, and means for moving said plunger out of locking position to allow said lever to be moved from automatic position to engaged position.

4. In an automatic clutch embodying frictional clutch elements and having a controlling lever mounted for movement into an engaged position, wherein the clutch is engaged at all speeds, a disengaged position, wherein the clutch is disengaged at all speeds, and an intermediate automatic position, wherein clutch engagement is automatically responsive to variations in the speed of one of the clutch elements, said lever carrying an adjustable abutment at its free end, means for selectively locking said lever against movement from automatic position to engaged position, comprising a plunger mounted for longitudinal movement from a retracted position into a locking position in the path of the adjustable abutment carried by said lever, said plunger being mounted for translational movement in a direction substantially normal to the axis of said lever, said lever being movable from automatic position to disengaged position without interference from said plunger when the latter is disposed in locking position, and means for moving said plunger out of locking position to allow said lever to be moved from automatic position to engaged position, said abutment being operable to effect minor movements of said lever when said abutment is locked in automatic position by said plunger.

5. For use with a clutch having a lever mounted for movement from an engaged to a disengaged position, a latch assembly for selectively locking said lever in a position intermediate said engaged and disengaged positions, comprising a hollow plunger casing mounted in fixed relationship to said clutch and having a pair of aligned apertures therein, a plunger mounted for reciprocation in said apertures and operable to project beyond said plunger casing and into the path of movement of said lever, and to be moved into a retracted position out of the path of movement of said lever, a spring disposed in said plunger casing and acting against said plunger and tending to urge the latter into the path of movement of said lever and means for pulling said plunger into retracted position against the action of said spring.

6. The device described in claim 5, wherein said plunger is of generally cylindrical shape and is provided with a flattened side which cooperates with said lever and with means provided in said casing for restraining said plunger against rotation about its axis.

7. The device described in claim 5, wherein said spring comprises a compression spring encircling said plunger and acting against abutment means provided on said plunger and reacting against an internal wall of said casing.

8. The device described in claim 5, wherein said last-named means embodies a detent means sufficiently strong to maintain said plunger in retracted position against the action of said spring.

ROBERT P. LEWIS.